Oct. 16, 1934.    J. DICKSON    1,976,838
LUBRICATING MEANS FOR JOURNAL BEARINGS
Filed March 30, 1931
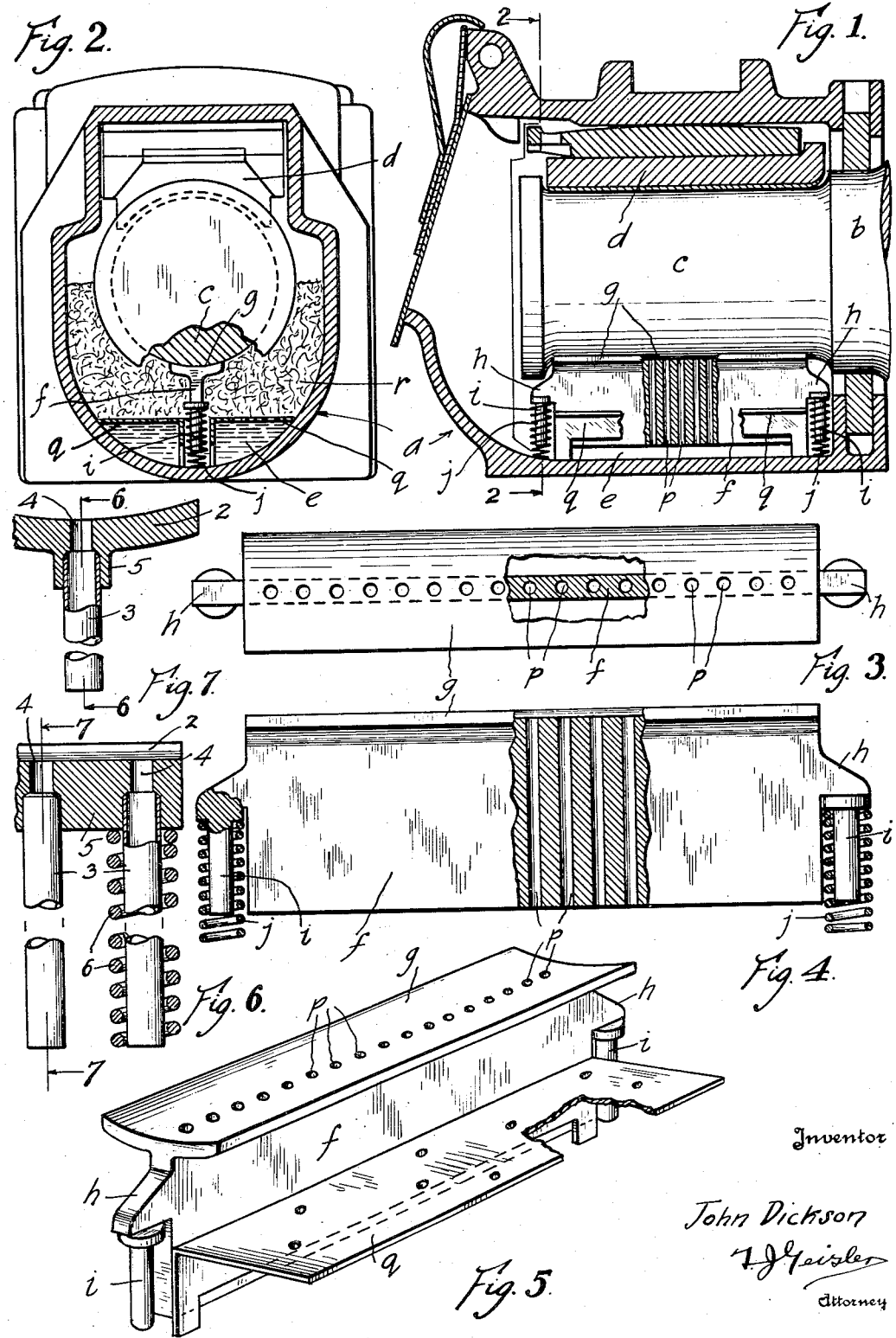

Patented Oct. 16, 1934

1,976,838

UNITED STATES PATENT OFFICE 1,976,838

LUBRICATING MEANS FOR JOURNAL BEARINGS

John Dickson, Portland, Oreg., assignor of one-half to W. F. Prier, Portland, Oreg.

Application March 30, 1931, Serial No. 526,390

3 Claims. (Cl. 308—85)

My invention has for its object to provide dependable means assuring efficient lubrication of journal bearings, particularly the journal bearings of locomotive trucks and trailers since these receive the hardest duty, due to the very great weight which they have to carry.

Experience has shown that to rely upon waste packing being kept moist with the lubricating oil by capillary attraction is neither efficient nor dependable means for lubricating journal bearings; particularly is this true in the case of journal bearings of the engine trucks and the trailers of a locomotive.

My invention employs waste-packing as the medium by which the lubricating oil is applied to the journal; but since it is necessary that the waste packing be kept saturated with the lubricant, I employ a suction pump adapted to be operated by the rotation of the journal in order to keep such packing constantly saturated; the suction pump having a wide concaved head fitting the journal face and being resiliently supported against the journal face by a spring element; I encompass said pump element and the lower half of the journal with the waste packing, and support the waste packing on a grid or screen. In that way the oil is constantly circulated thru the waste-packing keeping the latter saturated and the unretained oil is strained from said waste-packing back into the well of lubricating oil for recirculation.

The details of the construction of the means by which I attain my objects, and incidental features, are hereinafter fully described with reference to the accompanying drawing.

In the drawing:

Fig. 1 shows the journal end of a car axle and the journal box embodying my invention;

Fig. 2 shows a transverse section on the line 2—2 of Fig. 1;

Fig. 3 shows a top view of one type of a lubricating plate or member constituting one of the elements of my invention; this figure also gives the measurements of the width of the upper surface of said lubricating plate or member relative to the diameter of the oil ducts;

Fig. 4 shows a side elevation of such type of lubricating plate;

Fig. 5 shows a perspective elevation of said type of lubricating plate and also shows in connection therewith waste supporting plates used as an element of my invention for supporting the waste in the bottom of the journal box clear of the lubricant;

Fig. 6 shows a longitudinal sectional fragment of another type of my lubricating plate; and Fig. 7 shows a transverse section taken on the line 7—7 of Fig. 6.

Referring now to the figures: I have shown a standard journal box $a$ having an axle $b$ mounted therein with the axle journal $c$ riding against the usual bearing plate $d$. The lower part of the journal box $a$ is provided with a lubricant reservoir or well $e$ covered by a grid or screen $q$ on which is loosely supported waste-packing $r$ arranged to cover the lower half of the face of the journal $c$ so as to have ample contact therewith. The lubricating oil is brought up to the journal face thru the medium of a suction pump $f$ provided with a wide concaved head $g$ which fits the journal face; and the pump is supported on springs $j$ so as to keep its head $g$ in contact with the journal face. The latter in rotating draws the lubricating oil to the head $g$ of the pump $f$ and from there carries it to and saturates the waste-packing. The lubricating oil is thus constantly circulated thru the loose waste-packing and keeps it saturated; and the lubricating oil which the waste-packing does not retain is strained from it back into said well $e$ for recirculation.

The pump is provided with laterally projecting lugs $h$ having downwardly extending pins $i$ by which the pump is supported on coil springs $j$. The pump $f$ may consist of a body provided with a series of cylindrical ducts $p$, see Figs. 3 and 4, of such diameter as to permit the free passage of the lubricating oil therethru. The grid or screen $q$ preferably consists of complementary sections spaced apart so that the lower or intake end of the pump $f$ may extend down between said grid parts into the body of oil in the well $e$.

In operation, as the axle $b$ rotates over the bearing surface $g$, the ends of the ducts $p$ are held closely against the journal by the springs $j$ and such rotation of the journal creates a suction or pumping action in the ducts which raises the lubricant from the reservoir through the ducts $p$ and into contact with the rotating journal, by which it is wiped away and thus the journal is covered with a continuously supplied and ample film of lubricant.

The excess lubricant thus spread on the journal is carried into the waste packing $r$ which quickly becomes saturated and permits the excess lubricant collected from the journal by the packing to drain back in the bottom of the journal box thus replenishing the supply, which is again circulated by the pump f and thus maintains the waste-packing saturated and ensures efficient and ample lubrication of the journal face.

Further, I preferably provide a series of the ducts p instead of a single elongate duct in order that any worn portions or inequalities in the axle surface, which might fail to make a close contact with the body e and permit air to leak between them into the said duct and destroy the vacuum and the pumping action, will only effect the operation of one duct and not as in the case of a single elongate duct prevent the operation of the entire device.

Referring now to Figs. 6 and 7: I have shown another form of lubricating device somewhat simpler in construction in which a bearing plate 2 is provided similar to the bearing first described, except that the body portion f thereof is omitted and tubes 3 are provided in place of the ducts 4. Such tubes are inserted in the longitudinal boss 5 and extend downwardly into the lubricant reservoir of the journal box. In the latter construction the coil spring supporting elements 5 may be omitted and coil springs 6 placed on the end tubes 3, as illustrated in Fig. 6.

I claim:

1. Lubricating means for journal-bearings comprising a journal-box adapted to provide a well at the bottom for holding a body of oil, a grid covering said well, a pump element comprising a suction section encompassed by said grid whose intake end extends into said well, and provided with a wide concaved head fitting the journal face and extending substantially the length thereof, a spring element holding the said head against the journal face, and a body of loose waste packing supported on said grid, and arranged to encompass said pump element and the lower half of the journal face, whereby the oil is constantly circulated thru said waste packing, keeping it saturated, and the unretained oil is strained from said waste packing back into said well for recirculation.

2. Lubricating means for journal-bearings comprising a journal-box adapted to provide a well at the bottom for holding a body of oil, a grid composed of parts arranged to leave a space between them alined with the vertical central plane of the journal, said grid covering said well, a pump element inserted in said space comprising a suction section whose intake end extends into said well, and provided with a wide concaved head fitting the journal face and extending substantially the length thereof, a spring element holding the said head against the journal face, and a body of loose waste packing supported on said grid, and arranged to encompass both sides of said pump element and the lower half of the journal face, whereby the oil is constantly circulated thru said waste packing, keeping it saturated, and the unretained oil is strained from said waste packing back into said well for recirculation.

3. Lubricating means for journal-bearings comprising a journal-box adapted to provide a well at the bottom for holding a body of oil, a grid covering said well, a pump element comprising an elongate vertically channeled body whose intake ends extend into said well and provided with a wide head fitting the journal face and extending substantially the length thereof, the pump element being adapted to be actuated by the rotation of the journal, a spring element holding the said head against the journal face, a body of loose waste packing supported on said grid and arranged to encompass said pump element and substantial portions of both sides of the journal face, whereby the oil is constantly circulated thru said waste packing, keeping it saturated, and the unretained oil is strained from said waste packing back into said well for recirculation.

JOHN DICKSON.